United States Patent
Ammann et al.

(10) Patent No.: US 8,175,137 B2
(45) Date of Patent: May 8, 2012

(54) METHOD OF PROCESSING A DIGITAL SIGNAL DERIVED FROM A DIRECT-SEQUENCE SPREAD SPECTRUM SIGNAL

(75) Inventors: Michael Ammann, Huenenberg (CH); Heinz Mathis, Uerikon (CH)

(73) Assignee: u-blox AG, Thalwil (CH)

( * ) Notice: Subject to any disclaimer, the term of this patent is extended or adjusted under 35 U.S.C. 154(b) by 669 days.

(21) Appl. No.: 12/379,230

(22) Filed: Feb. 17, 2009

(65) Prior Publication Data

US 2010/0166046 A1  Jul. 1, 2010

(30) Foreign Application Priority Data

Dec. 30, 2008  (EP) .................................... 08405316

(51) Int. Cl.
*H04B 1/00*  (2006.01)
(52) U.S. Cl. ...................................................... 375/150
(58) Field of Classification Search .................. 375/142, 375/150
See application file for complete search history.

(56) References Cited

U.S. PATENT DOCUMENTS

| | | | |
|---|---|---|---|
| 5,347,284 A | | 9/1994 | Volpi et al. |
| 5,550,811 A | * | 8/1996 | Kaku et al. ..................... 370/342 |
| 7,796,694 B1 | * | 9/2010 | O'Connor et al. ............. 375/242 |
| 2006/0165200 A1 | * | 7/2006 | Wagner et al. ................. 375/354 |
| 2007/0116104 A1 | * | 5/2007 | Fujiwara et al. ............... 375/149 |
| 2008/0076395 A1 | | 3/2008 | Bhatia et al. |
| 2008/0232441 A1 | | 9/2008 | Mester et al. |

FOREIGN PATENT DOCUMENTS

| EP | 1 903 346 A1 | 3/2008 |
|---|---|---|
| EP | 1 983 351 A1 | 10/2008 |

OTHER PUBLICATIONS

Ward, "GPS Receiver Search Techniques," *Position Location and Navigation Symposium*, IEEE, Apr. 22-26, 1996, pp. 604-611.

* cited by examiner

*Primary Examiner* — Don N Vo

(57) ABSTRACT

In a GNSS receiver data sequences derived from a digital signal each with an internally generated correlation sequence derived from a basic sequence and mixed with frequency signals corresponding to various Doppler frequencies and in various phase positions with respect to the data sequence are correlated and the correlation values evaluated. In difficult conditions, e.g., RF levels of the signal of −145 dBm and less, correlation values produced with the same correlation sequence and phase position but with a plurality of data sequences are evaluated together in that, in an evaluator (49), every-correlation value is, in a comparator (52), compared with at least a first value threshold and a second value threshold, with the latter having a value between 1.3 and 1.7 times the value of the first and values −1, 0 or +1 assigned accordingly to a correlation term which is then added to an integer correlation counter which varies over a counter interval, e.g., [0, 15], in an adding unit (53). The correlation counters corresponding to the various Doppler frequencies and phase positions are stored in a memory unit (54). In an arbitration unit (51) a correlation indicator is derived from each correlation counter and the latest corresponding correlation value and the six largest correlation indicators selected and stored together with their Doppler frequencies and phase positions.

17 Claims, 5 Drawing Sheets

METHOD OF PROCESSING A DIGITAL SIGNAL DERIVED FROM A DIRECT-SEQUENCE SPREAD SPECTRUM SIGNAL

FIELD OF THE INVENTION

The invention concerns a method of processing a digital signal derived from a direct-sequence spread spectrum (DSSS) signal, e.g., an analog input signal of a GNSS receiver which contains signals emitted by satellites of GNSS (Global Navigation Satellite System) positioning systems like GPS, GLONASS and GALILEO in order to determine a position.

PRIOR ART

A method according to the generic type is known from EP 1 983 351 A1. In a GNSS receiver, under poor conditions, i.e., generally weak and variable signal, a deep search mode is employed where correlation values from correlations of an internally generated correlation sequence derived from a basic sequence characteristic of a GNSS satellite with a plurality of, e.g., hundred, different data sequences derived from an analog input signal, are evaluated together, e.g., added up to form a correlation sum where in each case the summands correspond to a phase position of the correlation sequence with respect to the data sequences and to a Doppler frequency, i.e., a frequency tentatively used for Doppler shift compensation. The six or so largest correlation sums are then interpreted as indicating the presence of a sufficiently strong signal at the corresponding phase positions and Doppler frequencies. In this way, it is possible to decisively improve the signal acquisition rate at a given false alarm rate under difficult conditions as compared with the evaluation of single correlation values.

As the evaluation needs to be carried out—as far as possible in parallel—for a relatively large number of different phase positions and Doppler frequencies, the memory requirements for storing the correlation sums are, however, considerable. In the cited publication, the sums are rescaled when they tend to become too large and thereby kept within certain bounds, e.g., small enough to be stored in 8 bit memory cells.

In a similar method described in EP 1 903 346 A1 the correlation sums are also rescaled where necessary or reduced by subtraction of a minimum value or mean value derived from the individual correlation values.

The above-described methods of reducing memory requirements tend to lower detection sensitivity while relatively large—usually at least 8 bit—memory cells are still required for each one of the correlation sums. To further reduce memory requirements, a Tong detector can be employed which compares the single correlation values each with a threshold and modifies an integer correlation counter by incrementing or decrementing it depending on whether the correlation value is larger than the value threshold or whether it is smaller than or equal to it and indicates detection of a sufficiently strong correlation if the indicator reaches a counter threshold. It is usually sufficient to allow the correlation counter to vary over a relatively short interval—with a length of, e.g., 16—whereby the memory requirements are reduced to 4 bits per phase position and Doppler frequency.

It has been found, however, that use of a Tong detector leads to considerable losses in detection rate at a given false alarm rate as compared with the use of full or modified correlation sums. In weak signal conditions this loss may render signal acquisition slow or even impossible.

SUMMARY OF THE INVENTION

It is the object of the invention to propose a method of the generic type which offers high detection rates at a given false alarm rate with modest memory requirements.

This object is achieved by the features in the characterizing portion of claim 1. With the proposed method detection rates at a given false alarm rate are achieved which are only marginally lower than detection rates achievable by evaluating full correlation sums. Memory requirements, however, are reduced substantially.

BRIEF DESCRIPTION OF THE DRAWINGS

In the following the invention is described in more detail with reference to drawings showing a GPS receiver suitable for carrying out the method according to the invention where.

DESCRIPTION OF THE PREFERRED EMBODIMENTS

Figure 1:
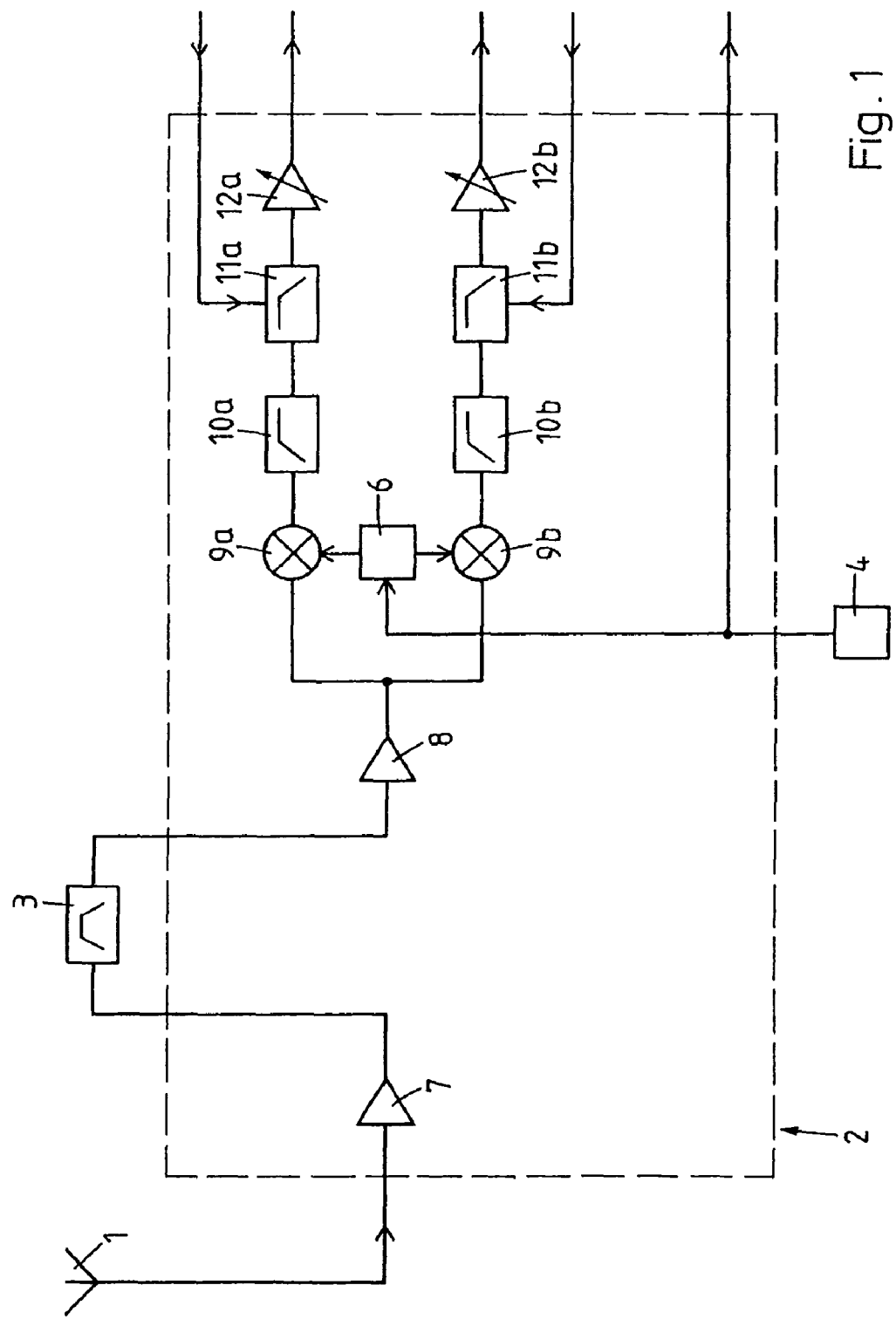
FIG. 1 shows a radio frequency circuit of the GPS receiver.
Figure 2:
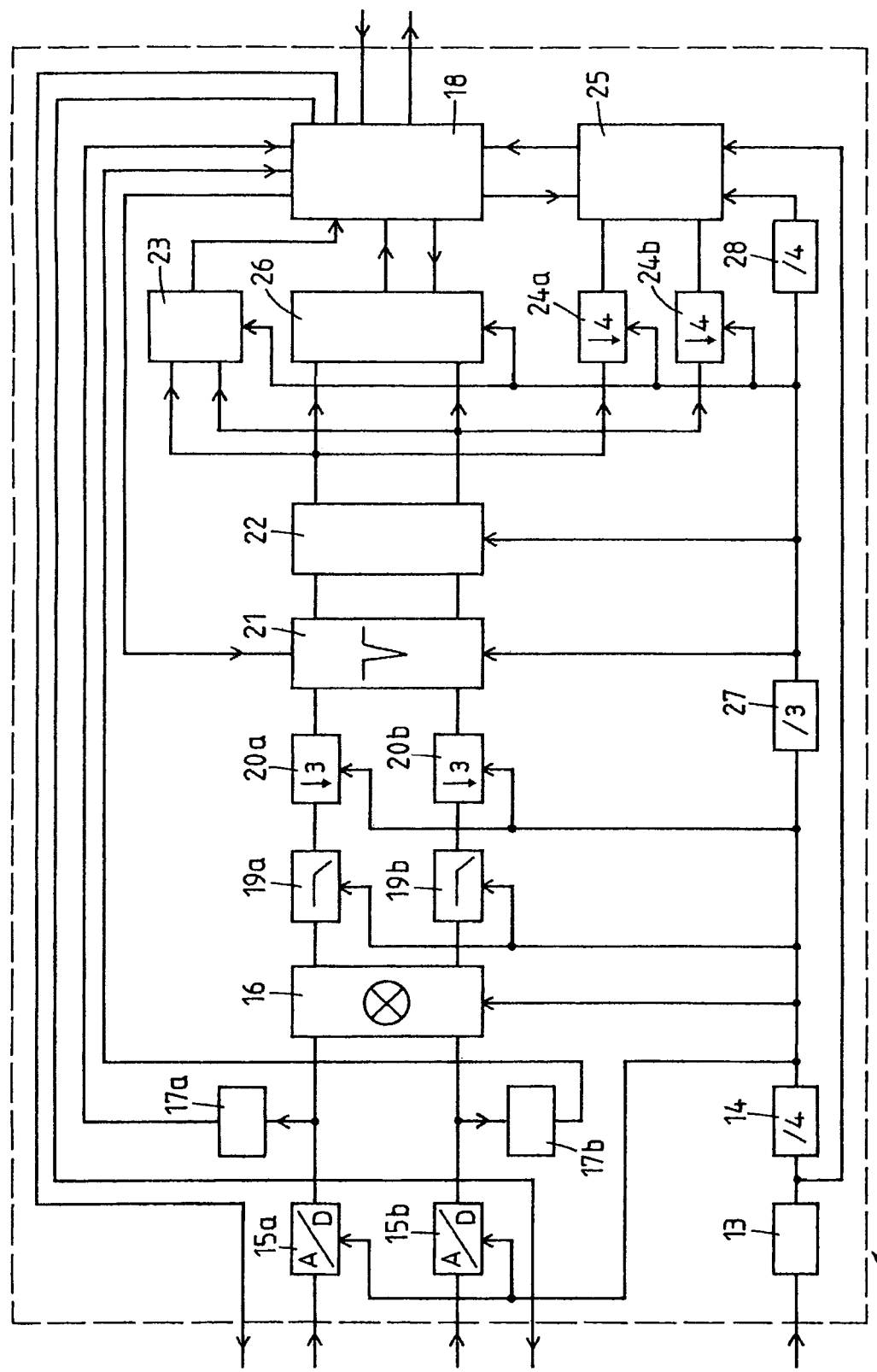
FIG. 2 shows a base band circuit of the GPS receiver.

The embodiment described in the following is a receiver suitable for GPS. The modifications which are necessary if other GNSS systems like GLONASS or GALILEO are to be used are straightforward. The receiver comprises (FIG. 1) an antenna 1 followed by a radio frequency circuit 2, a bandpass filter 3, a TCXO (temperature compensated crystal oscillator) 4 and (FIG. 2) a base band circuit 5. It is advantageous to implement the radio frequency circuit 2 and the base band circuit 5 each on a separate semiconductor chip but other solutions are also possible.

The bandpass filter 3, usually an SAW (surface acoustic wave) filter, is a component external to the radio frequency circuit 2. The TCXO 4, also a separate component, provides a basic frequency of between 19 MHz and 40 MHz, e.g., 26 MHz, which is fed to the radio frequency circuit 2 and further to the base band circuit 5. In the radio frequency circuit 2 the output signal of TCXO 4 controls a PLL unit 6 which produces a 3,158 MHz clock signal from which two further clock signals with half the clock rate, i.e., 1,579 MHz, are derived with one of the clock signals phase-shifted by 90° with respect to the other.

The antenna input of the radio frequency circuit 2 is followed by a low noise amplifier 7 which is connected, via the external band pass filter 3 and a controllable RF amplifier 8, to mixers 9a,b which also receive the clock signals from PLL unit 6. Together they form a complex mixer which provides an I and Q component of a complex analog signal shifted down to an intermediate frequency of approximately 3 MHz. They are each followed by a high pass filter 10a;b with a cutoff frequency of about 20 kHz and a controllable low pass filter 11a;b with a cutoff frequency of around 7.5 MHz connected to the output of the radio frequency circuit 2 via programmable gain amplifiers 12a;b.

The output of radio frequency circuit 2 is connected to an input of the base band circuit 5. The output signal of TCXO 4 is, via radio frequency circuit 2, also fed to the base band circuit 5 where it controls a PLL unit 13 producing a clock signal with a clock rate of 96 MHz which is reduced to 24 MHz by a subsequent frequency divider 14. Directly at the input of the base band circuit 5 A/D converters 15a,b with 5 bit resolutions are provided for sampling the input signal with a sampling rate of 24 MHz, producing a complex digital signal which is fed to a complex digital mixer 16 that reduces it to base band and to frequency analyzers 17a,b whose outputs are connected to a control unit 18 which controls the low pass filters 11a,b in radio frequency circuit 2. The mixer 16 is followed by decimation filters 19a,b, each with a cut-off frequency of 3 MHz, and down-samplers 20a;b. A/D converters 15a,b, mixer 16, frequency analyzers 17a,b, decimation filters 19a,b and down-samplers 20a,b are controlled by the clock signal from frequency divider 14.

A band stop unit 21 for filtering a raw digital signal by removing continuous wave signals and a decimator 22 for reducing the filtered digital signal from 6 to 3 bits are followed by a frequency analyzer 23 whose output signal is used by control unit 18 to control the band stop unit 21 and, via down-samplers 24a,b, by an acquisition unit 25 for identifying components of the signal as emitted by specific satellites of the GNSS system as well as by a tracking unit 26 for continually tracking the said signal components and analyzing their time delays and for extracting data bits from them.

A frequency divider 27 produces, from the 24 MHz signal output of frequency divider 14, a 8 MHz clock signal which controls band stop unit 21, decimator 22, frequency analyzer 23, down-samplers 24a,b and tracking unit 26. A further frequency divider 28 provides a 2 MHz clock signal for the acquisition unit 25 which also receives the 96 MHz clock signal from PLL unit 13. The control unit 18 receives data from the tracking unit 26 which, apart from the time delays of signals emitted by the individual satellites, comprise almanac and ephemeris data extracted from the said signals. From those data the control unit 18 calculates the position of the GNSS receiver. The calculations which may also involve additional data stored in the receiver or transmitted to it via some additional link are carried out in ways well known in the art. The control unit 18 also controls the acquisition unit 25 and the tracking unit 26.

After the analog signal received by the antenna 1 (FIG. 1) has been amplified by low noise amplifier 7 its spectrum is reduced to a 30 MHz band centered at the GPS frequency of 1,575.42 MHz by band pass filter 3. After further amplification and mixing any DC component is removed by high pass filters 10a,b and high frequencies are suppressed by low pass filters 11a,b for anti-aliasing. The low pass filters 11a,b are controlled by the control unit 18 (FIG. 2) based on the outputs of frequency analyzers 17a;b in such a way that the signal is, with respect to the signal at a reference frequency of 3 MHz, attenuated by not more than −3 dB at 7.5 MHz and by at least −12 dB at 12 MHz, i.e., at half the sampling rate of A/D converters 15a,b at the input of base band circuit 5. The programmable gain amplifiers 12a,b adjust the signal to the input range of the A/D converters 15a,b.

The amplified and filtered complex analog signal is then converted to a complex digital signal by A/D converters 15a,b of base band circuit 5 and then derotated, i.e., shifted essentially to zero by complex digital mixer 16. After its spectrum has been reduced to a 3 MHz frequency band by decimation filters 19a,b, its sampling rate is reduced to 8 MHz by down-samplers 20a;b. This raw digital signal which is restricted to a fixed raw signal frequency band extending from −3 MHz to +3 MHz is then fed to band stop unit 21 for filtering. Several continuous wave interferers can be suppressed with only negligible distortion of the raw digital signal to produce a filtered digital signal restricted to a filtered signal frequency band which coincides with the raw signal frequency band. In a next step the filtered digital signal is requantized from 6 bits to 3 bits in the decimator 22 which uses a non-linear decimation table. The resulting digital signal is then fed in parallel to frequency analyzer 23, tracking unit 26 and, via down-samplers 24a,b which reduce the sample frequency to 2 MHz, to acquisition unit 25.

In the acquisition unit 25 a signal derived from this input signal is correlated with internally produced characteristic sequences of GNSS satellites at various Doppler frequencies and with various phase shifts. The relatively low 2 MHz sample frequency allows efficient processing of the signal and, as a consequence, fast lock-on to received satellite signals.

On the other hand, in the tracking unit 26, where the same sequences, frequencies and phase shifts are applied as have yielded high correlation values in the acquisition unit 25, the higher sample frequency of 8 MHz allows for a very precise determination of the positions of the correlation peaks and associated phases of the said satellite signals which in turn allows a precise calculation of receiver position. The results from frequency analyzer 23 which may be a part of the tracking circuit 26 using channels with varying scanning frequencies and constant sequences, are employed for the detection of any continuous wave interferers and determination of their interferer frequencies which are then used by the control unit 18 for controlling band stop unit 21 in such a way that the interferer frequencies are suppressed. The interferer frequencies can be identified by cyclical sweeping through the raw signal frequency band in steps of, e.g., 1 kHz and comparing the individual energy densities with a mean over the entire frequency band.

Figure 3:
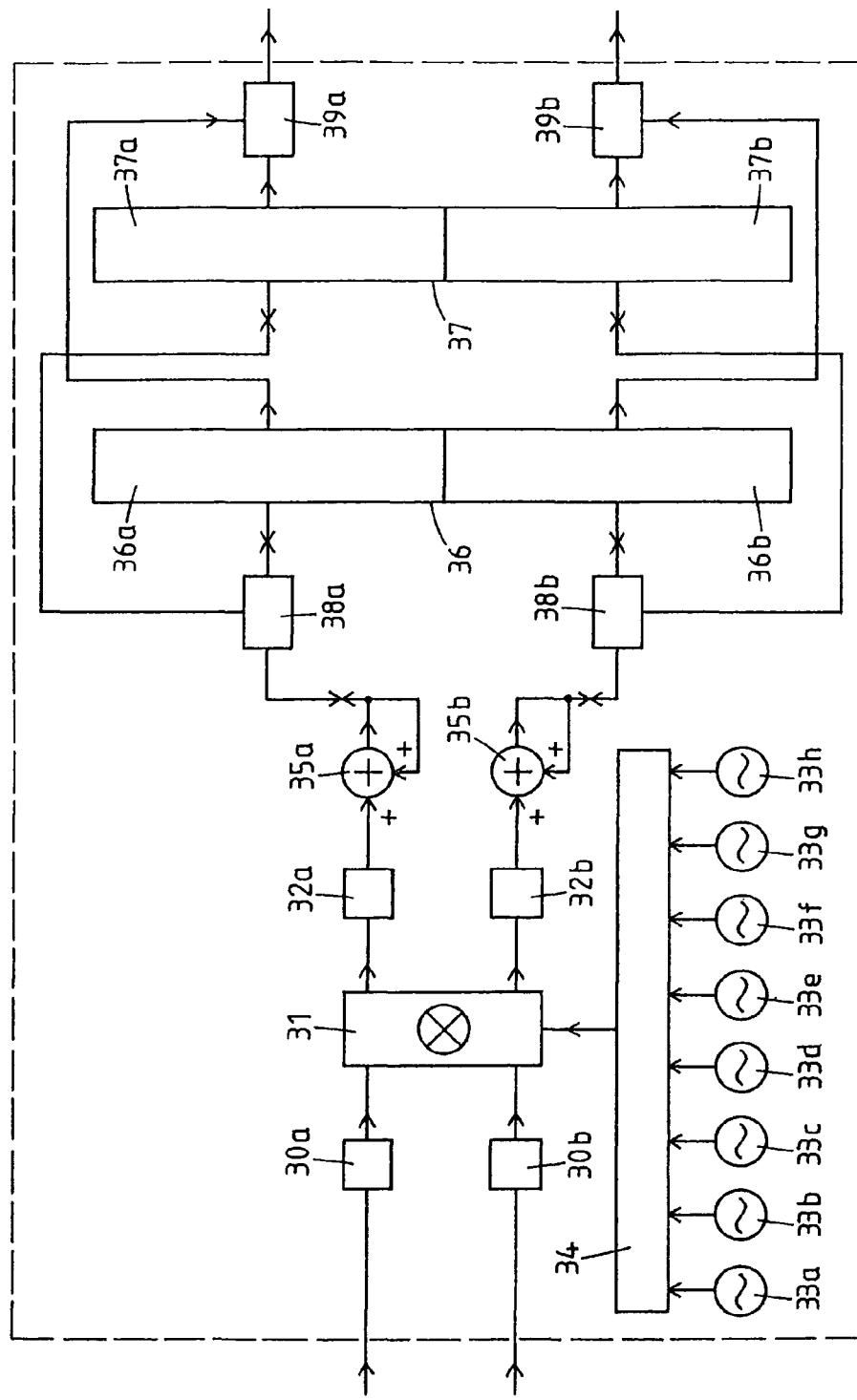
FIG. 3 shows an integrator of an acquisition unit forming part of the base band circuit of FIG. 2.

The acquisition unit 25 comprises three subunits. Its input is connected to the input of an integrator 29 (FIG. 3) with registers 30a,b followed by a complex mixer 31 and further registers 32a,b. The mixer 31 is controlled in turn by numerically controlled oscillators 33a-h via a multiplexer 34. Each of the registers 32a;b is followed by a limiting adder 35a;b which can be connected to either a memory unit 36a;b of a RAM-type memory 36 or a memory unit 37a;b of a second RAM-type memory 37 via switches 38a;b. Via further switches 39a;b either the memory units 36a;b or the memory units 37a;b can be connected to a first output line and a second output line, respectively, of the integrator 29. Each of the memory units 36a,b, 37a,b contains, for each of the eight oscillators 33a-h, a number of 7 bit memory cells which corresponds to the number of samples received during a basic interval, in the example 2,000. The address where a value is stored is determined by a number identifying the oscillator and the number of the sample, counted from the beginning of the basic interval. Preferably, the values pertaining to a specific oscillator are stored, in chronological order, under consecutive addresses.

Figure 4:
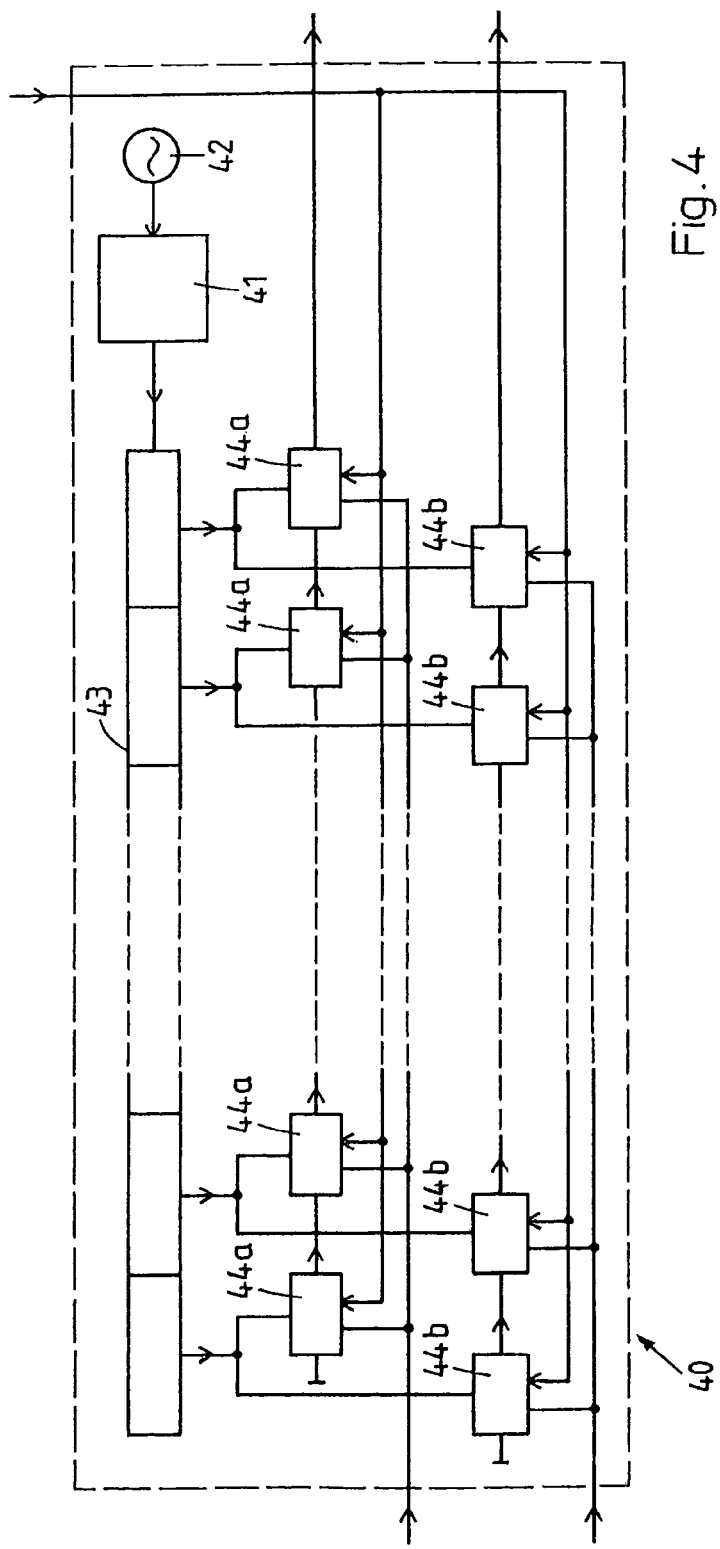
FIG. 4 shows a correlator of the acquisition unit.

The integrator 29 is followed by a correlator 40 (FIG. 4). It comprises a code generator 41 which is controlled by a numerically controlled oscillator 42. The code generator 41 is followed by a correlator shift register 43 with N cells where N is preferably chosen so as to have a multiple which is close to the length of the basic sequence, e.g., N=32, 64, 128, 256 or 512. Each of the cells of the correlator shift register 43 is connected to two correlator cells 44a, 44b. The correlator cells 44a form a first row of N correlator cells connected to a first input line of the correlator 40 which is in turn connected to the first output line of integrator 29 whereas the correlator cells 44b form a second such row which is in completely analogous manner connected to a second input line of the correlator 40 which is in turn connected to the second output line of integrator 29. Consecutive correlator cells in each row are also connected.

The correlator cells 44a,b are, in a very space-saving manner, implemented on the surface of the semiconductor chip carrying the base band circuit 5 as identical structures arranged in two straight rows of length N, both in parallel with the correlator shift register 43 and input lines substantially as shown in FIG. 4. In fact, two correlator cells 44a,b can always be arranged beside the memory cell of the correlator shift register 43 they are connected to and, together with connections and sections of the input lines, integrated into a larger structure on the chip surface which is repeated identically N times along a straight line. This way the correlator 40 can be manufactured very efficiently.

Figure 5:
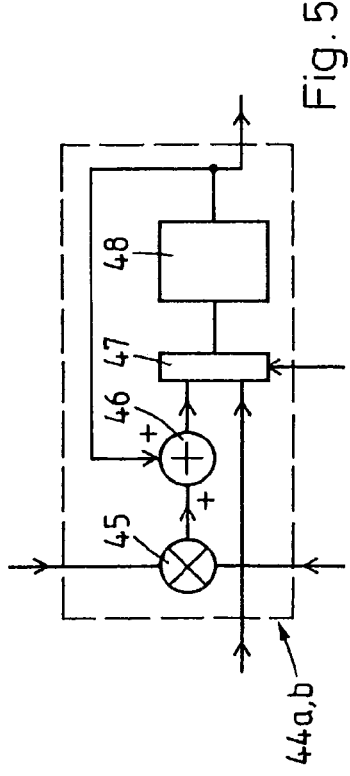
FIG. 5 shows a correlator cell of the correlator of FIG. 4

Each of the correlator cells 44a,b comprises (FIG. 5) a multiplier 45 whose inputs are connected to one of the cells of the correlator shift register 43 and the first input line or the second input line of the correlator 40, respectively, followed by a simple adder 46. A switch 47 connects the input of a register 48 either to the output of adder 46 or to an input which is connected to an output of the register 48 of the preceding correlator cell 44a;b in the row or, in the case of the first correlator cell, to a register holding an initial value of zero. The output of the register 48 is connected to an input of the adder 46 and to an input of the switch 47 in the subsequent correlator cell or, in the case of the last correlator cell, to an output line of the correlator 40. Depending on the states of the switches 47 the registers 48 of the correlator cells 44a and of the correlator cells 44b are either disconnected or they form two rows of registers 48 each configured like a shift register or daisy chain.

Figure 6:
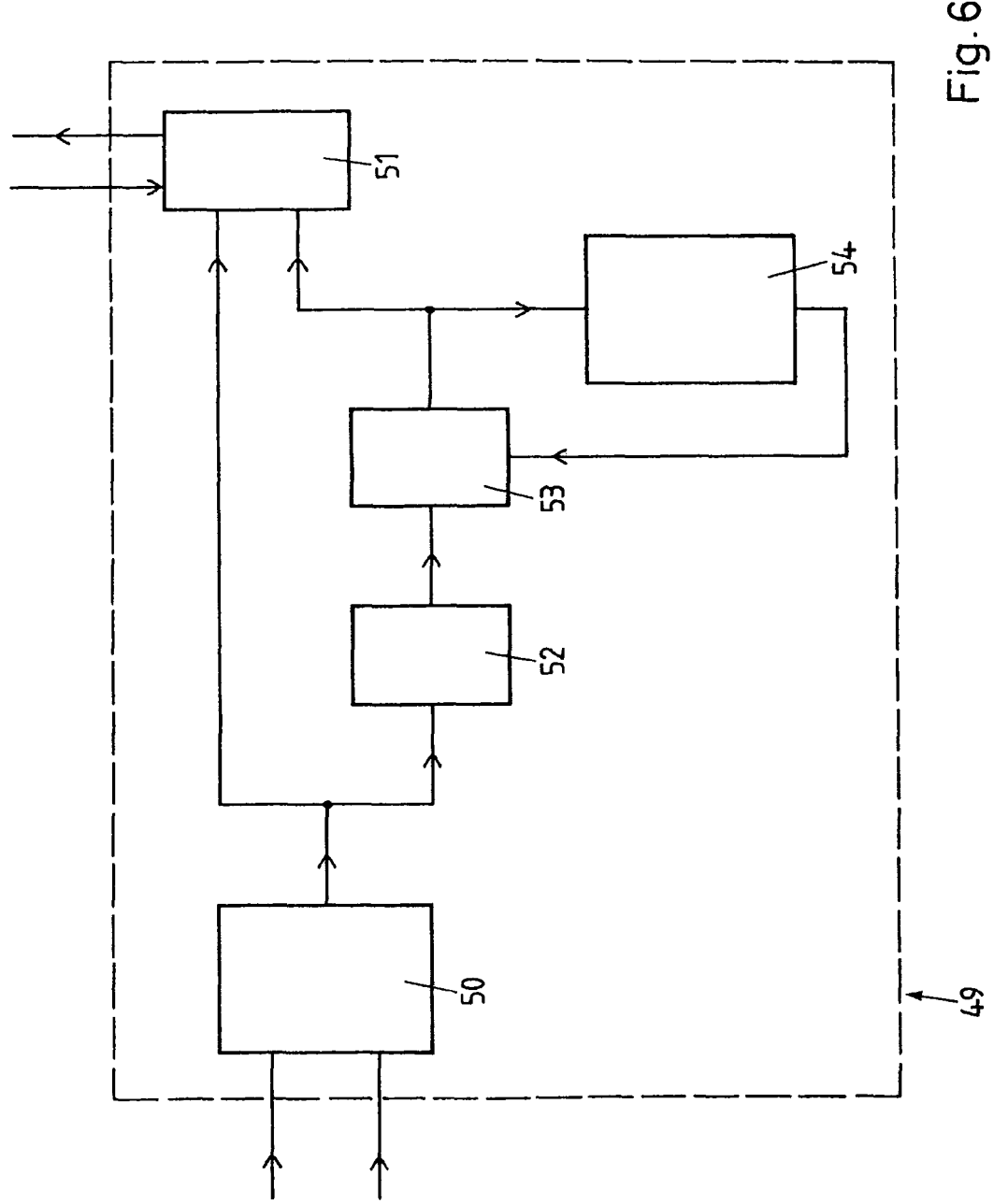
FIG. 6 shows an evaluator of the acquisition unit.

The correlator 40 is in turn followed by an evaluator 49 (FIG. 6) whose input lines are connected to a processing unit 50. The output of the latter is connected in parallel to a first input of an arbitration unit 51 whose output connects to output lines of the evaluator 49 leading to control unit 18 and which is controlled by the latter and to a comparator 52 which is in turn connected to a first input of an adding unit 53. The output of the latter is connected to a second input of the arbitration unit 51 as well as to a RAM-type memory unit 54 whose output is connected to a second input of adding unit 53.

In the integrator 29 an integration process is carried out over an integration period which is a multiple of the basic interval of 1 ms, e.g., over 20 ms or more. Samples of the base band complex digital signal, after it has been reduced to 3 bits in decimator 22 and passed the down-samplers 24a,b, arrive at the input of the integrator 29 at a sample frequency of 2 MHz and the I and Q components are stored for the duration of a corresponding interval of approximately 0.5 µs in registers 30a;b. The signal is then mixed in turn with the various frequency signals corresponding to different Doppler frequencies which are output by each of the oscillators 33a to 33h to tentatively compensate for Doppler shift and possible clock error of the GNSS receiver and the components of the result are, at a frequency of 16 MHz, delivered to the registers 32a;b. The switches 38a,b connect the adders 35a;b to either memory units 36a;b or memory units 37a;b for the duration of the integration period whereas the remaining memory units 37a;b or 36a;b, respectively, are connected to the output of the integration unit 29 via switches 39a;b. For the sake of simplicity it is assumed in the following that memory units 36a,b are connected to the adders 35a;b and memory units 37a,b to the outputs.

The digital values stored in the registers 32a;b are fed to one input of the adder 35a;b while an intermediate digital value from a memory cell of memory unit 36a;b or, at the beginning of the integration period, a zero is fed to the other input. The result output by the adder 35a;b, i.e., the sum of the intermediate value read from the memory cell and the value from the register 32a;b, is then written to the same memory cell as a new intermediate value, the previous intermediate value being overwritten. This read-modify-write cycle requires three steps and therefore a 48 MHz clock rate.

If the integration interval is, e.g., M times the basic interval, samples which pertain to the same oscillator, i.e., the same Doppler frequency, and to the same phase, i.e., have the same position with respect to the beginning of the basic interval, are added up coherently whereby the signal to noise ratio is considerably increased in comparison with the incoming digital signal. An integration period of 20 ms which conforms to the length of a data bit is adequate for a 'cold start' where no data are known previously to acquisition. If satellite data are known beforehand inversions of the basic sequence due to modulation by data bits can be taken into account and longer integration intervals are possible.

At the same time, the memory units 37a,b which are connected to the outputs of the integrator unit 29 and further to the correlator unit 40 can be read with a different clock rate which is independent from the clock rate for the read-modify-write cycle and preferably higher, e.g., 96 MHz.

In the correlator 40 the I-component of the output signal of the integrator unit 29 is fed in parallel to each of the correlator cells 44a in the first row and the Q component to the correlator cells 44b of the second row. The code generator 41 generates a binary correlation sequence which is derived from the basic sequence characteristic of one of the satellites in that it consists of fixed multiples of the basic values, i.e., every one of the basic values is repeated a fixed number of times, e.g., K times with $K \geq 1$. The length of the correlator sequence is accordingly 1,023×K. In the following the limiting case with K=1 is assumed where the correlation sequence corresponds to the basic sequence. Previously to the beginning of the correlation the code generator 41 has filled the correlator shift register 43 with the first N values of the correlation sequence, that is, with an initial subsequence of the said correlation sequence in such a way that the left-most cell of the correlator shift register 43 holds the first value of the correlation sequence and the right-most the $N^{th}$. In the following the code generator 41 generates further values of the correlation sequence until the same is complete, beginning with the $(N+1)^{th}$.

While the correlation sequence is further shifted through the correlator shift register 43 the data values read from the memory units 37a,b are fed to the first input and second input, respectively, of the correlator 40 as a data sequence. The ratio of the frequency of code generation to the frequency of data value read-out corresponds to the ratio of the chip rate of the basic sequence to the sample rate, i.e., 1,023 to 2,000. Normally two consecutive data values are therefore processed with the same value of the correlation sequence, but there are 23 extra shifts of the said sequence by 1 where the value changes after having been used with a single data value.

During a correlation phase the 2,000 consecutive data values making up the data sequence are processed in each of the correlator cells 44a,b in parallel together with the 1,023 values of the correlation sequence, that is, the complete correlation sequence. At the end of the correlation phase the left-most cell of the correlator shift register 43 holds the $1,023^{rd}$ value of the correlation sequence and the right-most the $(N-1)^{th}$. In each of the correlator cells 44a,b a correlation value is determined, in the example a correlation value component which is calculated in that the actual data value, i.e., its I or Q component, respectively, is in each case multiplied in the multiplier 45 by the actual value from the memory cell of the correlator shift register 43 the correlator cell is connected to and the product, in adder 46, added to the sum of previous results and the sum written to the register 48 via switch 47.

When the correlation phase is finished, a read-out phase follows. The position of switch 47 is changed in every one of the correlator cells 44a,b by a control signal from control unit 18 and the input of the register 48 connected to the output of the register 48 of the preceding cell. The registers 48 of the first row and the second row, respectively, are thereby connected to form a shift register or daisy chain connected to the first output and the second output, respectively, of the correlator 40. Their contents are in each case shifted to the right (FIG. 4) through the corresponding row of registers 48 and appear sequentially at the outputs of the registers 48 of the last, that is, right-most of the correlator cells 44a;b, i.e., at the first output line and the second output line, respectively, of the correlator unit 40 while at the same time the registers 48 are, from the left, filled with zeros for initialization.

The N correlation values correspond to correlations of the data sequence with N copies of the correlation sequence where a copy of the basic sequence is in each case delayed by 1 with respect to the previous copy. That is, for a given Doppler frequency and a given satellite correlations corresponding to N different phase positions of the correlation sequence with respect to the incoming signal are calculated in parallel.

During the read-out phase, i.e., while the correlation values are sequentially delivered to the evaluator 49, the code generator 41 produces N more values of the correlation sequence which are fed through the correlator shift register 43. At the end of the read-out phase the correlator shift register 43 therefore holds a new initial subsequence beginning with the $(N+1)^{th}$ value in the left-most cell and ending with the $(2N)^{th}$ value of the correlation sequence in the right-most cell, i.e., the part of the correlator sequence following immediately and without overlap upon the previous initial subsequence and having the same length of N.

During the next correlation phase the same data values are fed to the correlator 40 and processed in a completely analogous manner with the only difference that the phase positions of the correlation sequence with respect to the data sequence have been increased by N. With N=64, 128, 256 or 512, after 16, 8, 4, or 2 passes, respectively, each comprising a correlation phase and a read-out phase, 1,024 correlations for all relative phase positions of the correlation sequence with respect to the data sequence—with an overlap of 1—have been calculated and delivered to the evaluator 49.

In the example given above—where K=1—the data sequence is correlated with 1,024 copies of the basic sequence with a copy shifted by one place with respect to an immediately preceding copy in each case. The time resolution is consequently one chip. If a time resolution of half a chip is desired, K is chosen to equal 2. In that case the $(2n)^{th}$ and the $(2n-1)^{th}$ value of the correlation sequence both equal the $n^{th}$ value of the basic sequence, i.e., the first and second values of the correlation sequence correspond to the first basic value, the third and fourth values to the second basic value and so on. The code generator then feeds the 1,023×2=2,046 values of the correlation sequence to the correlator shift register 43. The data sequence is correlated with 2,048 copies of the correlation sequence with each copy again shifted by one with respect to the preceding copy—with an overlap of 2. However, a shift by one corresponds in this case to a shift by half a chip length of the basic sequence with respect to the basic sequence as encoded in the satellite signal. The number of passes, each comprising a correlation phase and a read-out phase, is double the number with full chip resolution. Choosing a higher value for K only leads to truly better time resolution if the sampling rate is commensurate. The length of the data sequence should be at least approximately equal to the length of the correlation sequence or greater.

Contrarily, it is also possible in the first-described K=1 case, to speed up processing by using a data sequence which consists of every second data value stored in memory 37. In that case the number of passes is the same but the time required for a correlation phase is cut in half. The read-out phase, however, is not affected.

During each read-out phase correlation value components $C_I$, $C_Q$, corresponding to the I and Q components of the data values, are delivered from the correlator 40 to the processing unit 50 of the evaluator 49. Here they are combined to form a correlation value $C_T$ with $$C_T = \max(|C_I| + |C_Q|/4, |C_Q| + |C_I|/4) \quad (1)$$

This expression has been found to approximate the absolute value of $(C_I, C_Q)$, i.e., $\sqrt{(C_I^2 + C_Q^2)}$ sufficiently well for evaluation purposes whereas it requires much less processing time than the calculation of the exact value. This is an important advantage since the evaluator runs at a high clock rate.

In a normal mode of the evaluator 49 correlation values from the output of the processing unit 50 are used as correlation indicators in arbitration unit 51. The latter selects and stores a set of largest correlation indicators, preferably three or more of them, e.g., six, in descending order together with parameters identifying the corresponding basic sequence, Doppler frequency and phase position. If a new correlation indicator is larger than the sixth largest found so far the new correlation indicator is inserted and the latter dropped. The arbitration unit 51 also keeps track of the minimum and of the sum of the correlation values. At the end of a correlation the six largest correlation indicators, each together with the corresponding parameters indicating basic sequence, phase position and Doppler frequency, are delivered to the control unit 18.

A complete normal correlation process usually consists of carrying out many single correlations, each using a specific basic sequence and taking into account all possible phase positions of the same with the desired resolution—in the examples 1,023 and 2,046 different phase positions—and a number of Doppler frequencies—eight of them in the examples. The basic sequences employed are usually restricted to such as are characteristic for satellites which are likely to be visible at the time. One and the same data sequence can normally be used for all correlations.

If the largest correlation indicators are sufficiently pronounced compared with the average of the correlation indicators the normal mode described above yields a sufficient set of data for the control unit 18 to control the tracking unit 26 accordingly. If not enough of sufficiently pronounced such largest correlation indicators are found clock error is a possible cause. The control unit 18 will therefore try further Doppler frequencies in the integrator 29 which are either higher or lower than the frequencies employed so far.

However, a lack of sufficiently significant correlation values where the largest of them remain below a certain threshold as compared with the average may also be due to especially difficult conditions, in particular a low and variable RF level of the signal of, e.g., between −145 dBm and −165 dBm. In this case the evaluator 49 is switched to a deep search mode by the control unit 18. In this mode, a deep search correlation process is carried out where every correlation involves a large number of single correlations, e.g., fifty of them, each corresponding to a normal correlation process as described above.

For each correlation step a fresh data sequence consisting of a set of data values is used and the correlation values which correspond to the various data sequences but to the same basic sequence, phase position and Doppler frequency are in each case evaluated and the resulting correlation values processed cumulatively to yield a single correlation indicator.

During a deep search correlation process, data delivered to arbitration unit 51 by adding unit 53 are used in addition to the correlation values from processing unit 50. The complete correlation process consists of several correlation procedures each involving two basic sequences where the memory unit 54 is organised into 2×8 memory banks of 1,023 4 bit memory cells each containing an integer correlation counter corresponding to one of the two basic sequences, one of the 1,023 phase positions and one of the eight Doppler frequencies. At the beginning of the deep search correlation procedure, the contents of the memory cells are set to an initial value of the correlation counter which is the same for all cells. In each case, a correlation indicator is derived from the correlation counter and the correlation value as explained below. Again, the six largest correlation indicators are stored in arbitration unit 51 in descending order together with parameters identifying in each case the corresponding basic sequence, phase position and Doppler frequency. The memory cells for the largest correlation indicators in the arbitration unit 51 are initialised to zero.

During a correlation step with one of the fifty data sequences single correlations involving the two basic sequences are carried out, each with eight different Doppler frequencies and 1,023 phase positions. In each case the correlation counter corresponding to the basic sequence, phase position and Doppler frequency of the single correlation is retrieved from its cell in memory unit 54, subjected, in adding unit 53, to a modification depending on the value of the correlation value $C_T$ as described in more detail below and the result written back to the cell as a new value of the correlation counter.

At the same time, it is fed to arbitration unit 51 where a correlation indicator is derived from the correlation counter and the correlation value delivered directly from processing unit 50 in such a manner that a larger or equal correlation counter results in a larger or equal correlation indicator and, where the correlation counters are equal, a larger correlation value leads to a larger correlation indicator, i.e., the partial ordering of the correlation indicators with respect to magnitude ($\geqq$) corresponds to the partial ordering of the correlation counters with respect to magnitude.

Derivation of correlation indicators having the above properties can be implemented by in each case forming a compound integer whose upper bits match the bits of the correlation counter and whose lower bits match those of the correlation value. In this case a larger correlation counter will always result in a larger correlation indicator whereas where correlation counters are equal a larger correlation value will result in a larger correlation indicator.

The newly formed correlation indicator is then compared with the previous values of largest correlation indicators stored there and, if it is larger than the smallest of them, inserted whereas the smallest value drops out. At the end of the correlation step when all single correlations for every combination of the two basic sequences, 1,023 phase positions and eight Doppler frequencies have been completed the six largest correlation indicators stored in arbitration unit 51 are, together with their parameters, fed to the control unit 18.

The correlation counter corresponding to a basic sequence, phase position and Doppler frequency is updated at every correlation step. When the single correlation where those parameters match is carried out the corresponding new correlation value $C_T$ is delivered from processing unit 50 to comparator 52 where it is compared with a first value threshold $\theta_1$ and a second value threshold $\theta_2$ which is greater than $\theta_1$ and a 2 bit correlation term is delivered to adding unit 53 which has a first value if the correlation value is smaller than $\theta_1$, a greater second value if the correlation value is equal to or greater than $\theta_1$ but smaller than $\theta_2$ and a still greater third value if the correlation value is equal to or greater than $\theta_2$. The values the correlation terms may assume form an ascending series with the second and third values being each greater by 1 than the preceding value, i.e., the values fill an interval like [−1, +1]. The corresponding correlation counter is then updated in that the correlation term is added to the same in adding unit 53. That is, depending on the magnitude of the correlation value as reflected by the results of the comparisons with the value thresholds $\theta_1$ and $\theta2$, the same is normally either decremented by 1 or remains unchanged or is incremented by 1.

As is well known, the correlation values follow a Rayleigh distribution if there is no correlation whereas if there is correlation they follow a Rice distribution whose probability density function is, where noise levels are equal, smaller than that of the Rayleigh distribution at small values and larger at large values. For small RF levels, however, the difference between the two distributions is slight.

The evaluation must distinguish between the two cases and provide a decision on whether the correlation values follow the Rayleigh distribution (no correlation) or the Rice distribution (correlation). Usually, a limit for a false alarm rate is set, e.g., to $10^{-3}$, and the evaluation is tuned in such a manner that the probability of a 'correlation' condition being signalled in the absence of correlation is not greater than the said limit. Under this condition, the detection rate, i.e., the probability that 'correlation' is signalled if there is indeed correlation, i.e., the data sequences do contain a component with the basic sequence, phase position and Doppler frequency of the correlation sequence, should be as high as possible.

There are several parameters which can be adjusted for tuning the evaluation explained above. Most important is an adequate choice of the value thresholds $\theta_1$ and $\theta_2$. Differences in noise level can be compensated for by scaling of the value thresholds $\theta_1$ and $\theta_2$ by the mean $m_0$ of the Rayleigh distribution where the latter is represented by its probability density function as follows:

$$p_0(r) = r/\sigma^2 \times \exp(-r^2/(2\sigma^2)) \tag{2}$$

with $$\sigma = m_0 \sqrt{(2/\pi)} \tag{3}$$

the square root of the RMS noise power. The mean $m_0$ as a measure of the noise level can be determined by correlating at least one data sequence with a correlation sequence which is known not to be encoded in the data signal, e.g., a constant sequence.

It has been found that, at a false alarm rate of approximately $10^{-3}$, and RF levels of below −145 dBm, detection rates are optimal with the first value threshold $\theta_1$ between 1.0 $m_0$ and 1.35 $m_0$, e.g., at 1.2 $m_0$ and the second value threshold $\theta_2$ between 1.3 and 1.7, e.g., 1.55, times the first value threshold $\theta_1$. Obviously, lowering any of the value thresholds leads to higher false alarm and detection rates. The expected RF level of the signal can also be taken into account in adjusting the thresholds.

The correlation counter is in each case a 4 bit integer and varies over a counter interval limited by a lower boundary and by an upper boundary whose length is 16. The counter interval may conveniently be chosen to be [0, 15].

If the expected value of the correlation term under a 'no correlation' condition where the data signal and, as a consequence, the data sequences, do not contain a component encoding the basic sequence the correlation sequence has been derived from with the phase position of the latter and with a Doppler shift approximately compensated by the applied Doppler frequency, is different from zero, e.g., equals a positive or negative drift d, then −1 or +1, respectively, is added $k_d$ times for every $n_d$ correlation steps to the correlation counter where $k_d/n_d$ is approximately equal to |d|. Usually, $k_d$ is set to one and $n_d \approx 1/|d|$. If, e.g., d≈0.25, $n_d$ is chosen to equal 4, that is, at every $4^{th}$ correlation step −1 is added to every correlation counter. Due to this regular adjustment positive or negative drift under a 'no correlation' condition which would raise the false alarm rate or lower the detection rate, respectively, is compensated for. The correlation counter is thus balanced and the interval can be kept short even if large numbers of correlation values are used in the correlation procedure.

If the correlation counter is at the lower boundary, in the example 0, negative correlation terms have no effect. If it reaches a counter threshold which coincides with the upper boundary it is set equal to the said threshold and kept at this value to the end of the correlation procedure. Later occurrence of a non-zero correlation term has no effect on the correlation counter in this case, in particular, the correlation counter is not reduced if a negative correlation term appears.

The initial value of the correlation counter can also be used to gauge the false alarm rate to some extent. Obviously, increasing the initial value will lead to higher false alarm rates and detection rates. Preferably, the initial value is chosen such that, under a 'no correlation' condition, the probabilities for the correlation counter to reach the upper boundary and the lower boundary during the correlation procedure are about the same. As the correlation counter is balanced this can be achieved by choosing an initial value close to the middle of the counter interval, e.g., 7.

The six largest correlation indicators which are, together with their parameters, transmitted to the control unit 18 at the end of a correlation step can be subjected to plausibility checks. For instance, if the six correlation indicators have all reached the correlator threshold this may be due to a strong signal or, on the other hand, to an inappropriate choice of value thresholds or jamming. These cases can be distinguished by checking whether the largest correlation indicators belonging to the same basic sequence 'cluster', that is, whether they correspond to phase positions and Doppler frequencies which are close to each other in which case it is likely that the large number of maxima is due to the signal being stronger than expected and that the results are valid. If, however, the checks reveal that the results are probably invalid the correlation process can be stopped and parameters like, e.g., the value thresholds, reset and the correlation procedure restarted or a new correlation procedure with different basic sequences initiated.

If the correlation procedure is carried through, however, the final results, i.e., the six largest correlation indicators stored in the arbitration unit 51 when the last correlation step has been carried out and the deep search correlation procedure is complete, are delivered to the control unit 18. The correlation procedure is repeated until all basic sequences have been used or, in any case, all of them which are characteristic for satellites which are likely to be visible at the time. When the last correlation procedure has been finished and the whole deep search correlation process is complete the results are used by the control unit 18 for identification of basic sequences, phase positions and Doppler frequencies where a sufficiently pronounced signal is present. The tracking unit 26 is then controlled accordingly.

Many modifications of the above-described evaluation method are, of course, possible. E.g., as in the case of a Tong detector, 'no correlation' can be signalled as soon as the lower boundary of the counter interval is reached. The counter threshold can be set to a value below the upper boundary of the counter interval and the correlation counter decremented even after it has reached or exceeded the counter threshold. In that case, the counter threshold is a further parameter which can be used in tuning the evaluation method. Also, the counter interval may be chosen longer, in particular 32, 64, 128 or 256—with increased memory requirements of 5, 6, 7, or 8 bits, respectively, as a penalty—or shorter, e.g., equal to 4 or 8, with a consequent loss of detector sensitivity.

It is also possible to employ at least one additional value threshold $\theta_3$ with the correlation term assuming a value of, e.g., +2 if the correlation value is equal to or greater than the said third value threshold $\theta_3$. With the third value threshold $\theta_3$ between 1.8 and 2.2 times, e.g., twice, the first value threshold $\theta_1$, the detection rate can be further improved to some extent. Introduction of still more value thresholds and larger corresponding correlation terms has been found to lead to ever less significant improvements, however. The number of data sequences and correlation values derived from them which are used in deep search mode is essentially arbitrary.

The correlation indicator can also be formed in ways which deviate from the example, e.g., reflecting the value of the correlation counter only or containing a truncated correlation value with a number of the least significant bits removed.

Deep search can also be used if the correlations are done with half chip resolution. In that case the memory unit 54 must be organised into 1×8 memory banks of 2,046 4 bit memory cells which implies that correlation values for only one basic sequence can normally be calculated and stored during a correlation step. The correlation sequence will have to be phase-shifted according to the Doppler frequency employed whenever the phase shift reaches half the length of a chip, that is, the length of the time interval between subsequent phase shifts will, for a given Doppler frequency, be half the length of the time interval in the case of full chip resolution.

Apart from GNSS systems, the method according to the invention can also be applied to the processing of other types of direct-sequence spread spectrum (DSSS) signals as used, e.g., in cellular telephony (UMTS) and WLANs.

| List of reference symbols | |
|---|---|
| 1 | antenna |
| 2 | radio frequency circuit |
| 3 | band pass filter |
| 4 | TCXO |
| 5 | base band circuit |
| 6 | PLL unit |
| 7 | low noise amplifier |
| 8 | controllable RF amplifier |
| 9a, b | mixers |
| 10a, b | high pass filters |
| 11a, b | low pass filters |
| 12a, b | variable gain amplifiers |
| 13 | PLL unit |
| 14 | frequency divider |
| 15a, b | A/D converters |
| 16 | complex mixer |
| 17a, b | frequency analyzers |

-continued

List of reference symbols

| | |
|---|---|
| 18 | control unit |
| 19a, b | decimation filters |
| 20a, b | down-samplers |
| 21 | band stop unit |
| 22 | decimator |
| 23 | frequency analyzer |
| 24a, b | down-samplers |
| 25 | acquisition unit |
| 26 | tracking unit |
| 27 | frequency divider |
| 28 | frequency divider |
| 29 | integrator |
| 30a, b | registers |
| 31 | complex mixer |
| 32a, b | registers |
| 33a-h | numerically controlled oscillators |
| 34 | multiplexer |
| 35a, b | adders |
| 36 | memory |
| 36a, b | memory units |
| 37 | memory |
| 37a, b | memory units |
| 38a, b | switches |
| 39a, b | switches |
| 40 | correlator |
| 41 | code generator |
| 42 | numerically controlled oscillator |
| 43 | correlator shift register |
| 44a, b | correlator cells |
| 45 | multiplier |
| 46 | adder |
| 47 | switch |
| 48 | register |
| 49 | evaluator |
| 50 | processing unit |
| 51 | arbitration unit |
| 52 | comparator |
| 53 | adding unit |
| 54 | memory unit |

The invention claimed is:

1. A method of processing a digital signal derived from a direct-sequence spread spectrum analog signal containing at least one encoded binary sequence consisting of repetitions of a characteristic basic sequence which extends over a basic interval, the method comprising the following consecutive steps:

deriving from the digital signal a plurality of data sequences each consisting of a series of data values, correlating each data sequence with a plurality of copies of a correlation sequence derived from the basic sequence, the copies having different phase positions with respect to the data sequences, by in each case sequentially multiplying the data values each with a value of the correlation sequence and adding up the products to form a correlation value corresponding to a phase position and a data sequence, evaluating for each phase position the correlation values established with the plurality of data sequences, where in each case the phase position of the correlation sequence with respect to the data sequence corresponds to the respective phase position, together in order to determine a correlation indicator corresponding to said phase position, where the evaluation involves for each phase position:

for each of the plurality of data sequences comparing the correlation value to at least a first value threshold and a second value threshold which is greater than the first value threshold and assigning to an integer correlation term a first value if the correlation value is below the first value threshold, a second value which is greater than the first value if the correlation value is equal to or greater than the second value threshold and a value greater than the second value otherwise, contributing to an integer correlation counter corresponding to the respective phase position by sequentially adding the correlation terms corresponding to said phase position and to one of the plurality of data sequences, determining the correlation indicator corresponding to the respective phase position where the determination involves the correlation counter corresponding to said phase position in such a way that the partial ordering of the correlation indicators with respect to magnitude corresponds to the partial ordering of the correlation counters with respect to magnitude.

2. The method of claim 1, where the determination of the correlation indicator involves in each case a latest correlation value in such a way that where correlation counters are equal the partial ordering of the correlation indicators with respect to magnitude corresponds to the partial ordering of the latest correlation values with respect to magnitude.

3. The method of claim 1, where the second value threshold is greater than the first value threshold by a factor of between 1.3 and 1.7.

4. The method of claim 1, where before the evaluation a measure of a noise level is determined and the value thresholds adjusted depending on said measure.

5. The method of claim 4, where a mean of the noise is determined as the measure of the noise level and the value thresholds are each adjusted essentially proportionally to said mean.

6. The method of claim 1, where the evaluation involves the selection of a number of the largest correlation indicators and the corresponding phase positions of the selected largest correlation indicators.

7. The method of claim 1, where the values which can be taken on by the correlation terms form an ascending series beginning at the first value, with any further value differing from its preceding value by +1.

8. The method of claim 1, where the correlation counter varies over a counter interval limited by a lower boundary and an upper boundary.

9. The method of claim 8, where the length of the counter interval is between 4 and 256.

10. The method of claim 8, where at the beginning of the evaluation the correlation counter is set to an initial value which is greater than the lower boundary.

11. The method of claim 8, where during the evaluation the value of the correlation counter is regularly adjusted to compensate for additions of correlation terms expected in a situation where the data signal does not contain the basic sequence that the correlation sequence is derived from at the corresponding phase position.

12. The method of claim 1, where, if during the evaluation the correlation counter assumes a value which at least equals a counter threshold, the correlation counter is fixed at the counter threshold.

13. The method of claim 12, where the counter threshold equals the upper boundary of the counter interval.

14. The method of claim 1, where the digital signal is mixed with a plurality of different frequency signals for compensating a Doppler frequency in that the data values are multiplied sequentially with numbers each representing one of the frequency signals and a correlation indicator is determined for each Doppler frequency.

15. The method of claim 1, where the direct-sequence spread spectrum analog signal is an input signal of a GNSS receiver and the at least one encoded binary sequence is characteristic of a GNSS satellite.

16. The method of claim 9, wherein the length of the counter is 4.

17. The method of claim 9, wherein the length of the counter is 16.

* * * * *

UNITED STATES PATENT AND TRADEMARK OFFICE
CERTIFICATE OF CORRECTION

PATENT NO.       : 8,175,137 B2
APPLICATION NO.  : 12/379230
DATED            : May 8, 2012
INVENTOR(S)      : Michael Ammann and Heinz Mathis It is certified that error appears in the above-identified patent and that said Letters Patent is hereby corrected as shown below:

In column 14, line 3, in claim 1, delete "than the second value threshold" and insert --than the first value threshold and smaller than the second value threshold,-- therefor.

Signed and Sealed this
Thirty-first Day of July, 2012

David J. Kappos
*Director of the United States Patent and Trademark Office*